United States Patent
Huang et al.

(10) Patent No.: US 11,714,678 B2
(45) Date of Patent: Aug. 1, 2023

(54) SMART SCHEDULING METHOD SUPPORTING PROCESS TASK VOLUME SPLITTING

(71) Applicant: SOUTH CHINA UNIVERSITY OF TECHNOLOGY, Guangzhou (CN)

(72) Inventors: Han Huang, Guangzhou (CN); Junpeng Su, Guangzhou (CN); Xueqiang Li, Guangzhou (CN); Zhifeng Hao, Guangzhou (CN)

(73) Assignee: SOUTH CHINA UNIVERSITY OF TECHNOLOGY, Guangzhou (CN)

( * ) Notice: Subject to any disclaimer, the term of this patent is extended or adjusted under 35 U.S.C. 154(b) by 495 days.

(21) Appl. No.: 17/052,426

(22) PCT Filed: Oct. 24, 2018

(86) PCT No.: PCT/CN2018/111621
§ 371 (c)(1),
(2) Date: Nov. 2, 2020

(87) PCT Pub. No.: WO2019/210653
PCT Pub. Date: Nov. 7, 2019

(65) Prior Publication Data
US 2021/0049041 A1 Feb. 18, 2021

(30) Foreign Application Priority Data
May 2, 2018 (CN) .......................... 201810409715.0

(51) Int. Cl.
*G06F 9/48* (2006.01)
*G06F 9/50* (2006.01)

(52) U.S. Cl.
CPC .............. *G06F 9/4881* (2013.01); *G06F 9/50* (2013.01)

(58) Field of Classification Search
None
See application file for complete search history.

(56) References Cited

U.S. PATENT DOCUMENTS 6,393,433 B1 * 5/2002 Kalavade ............ G06F 11/3452
8,250,579 B2 * 8/2012 Proctor ................. G06F 9/4881
717/133
(Continued)

FOREIGN PATENT DOCUMENTS

| CN | 102393687 A | 3/2012 |
| CN | 102542411 A | 7/2012 |

(Continued)

OTHER PUBLICATIONS

Zhang "Research an Intelligent Schedule Measure in Grid Network System", 2011 IEEE, 4 pages.*
(Continued)

*Primary Examiner* — Van H Nguyen
(74) *Attorney, Agent, or Firm* — Loza & Loza, LLP; Michael F. Fedrick

(57) ABSTRACT

An intelligent scheduling method for supporting process task quantity splitting, which may relax the limit on the number of parallel machines for overdue task lists under the constraint of using as few parallel machines as possible, and split time-consuming process task quantities according to the operating status of machines in different periods.

7 Claims, 1 Drawing Sheet

(56) References Cited

U.S. PATENT DOCUMENTS

| | | | | |
|---|---|---|---|---|
| 8,954,529 B2* | 2/2015 | Xu | ................. | G06F 9/4818 |
| | | | | 709/217 |
| 9,043,401 B2* | 5/2015 | Wong | ................. | H04L 67/1078 |
| | | | | 709/205 |
| 9,766,931 B2* | 9/2017 | Shah | ................. | G06F 9/4887 |
| 9,794,334 B2* | 10/2017 | Wong | ................. | H04L 67/1091 |
| 10,275,851 B1* | 4/2019 | Zhao | ................. | G09G 5/363 |
| 10,802,876 B2* | 10/2020 | Shah | ................. | G06F 9/4887 |
| 10,999,766 B2* | 5/2021 | He | ................. | H04W 28/0958 |
| 11,360,808 B2* | 6/2022 | Ray | ................. | G06T 1/20 |

FOREIGN PATENT DOCUMENTS

| | | | |
|---|---|---|---|
| CN | 105045236 A | | 11/2015 |
| CN | 106651139 A | | 5/2017 |
| CN | 107807623 A | | 3/2018 |

OTHER PUBLICATIONS

Gao et al. "A Novel Approach to Intelligent Scheduling Based on Fuzzy Feature Selection and Fuzzy Classifier", 1999 IEEE, pp. 5307-5311.*

Pham "Intelligent Scheduler with Fuzzy Techniques and Evolutionary Management in Heterogeneous Computing Systems", 1997 IEEE, pp. 122-127.*

* cited by examiner

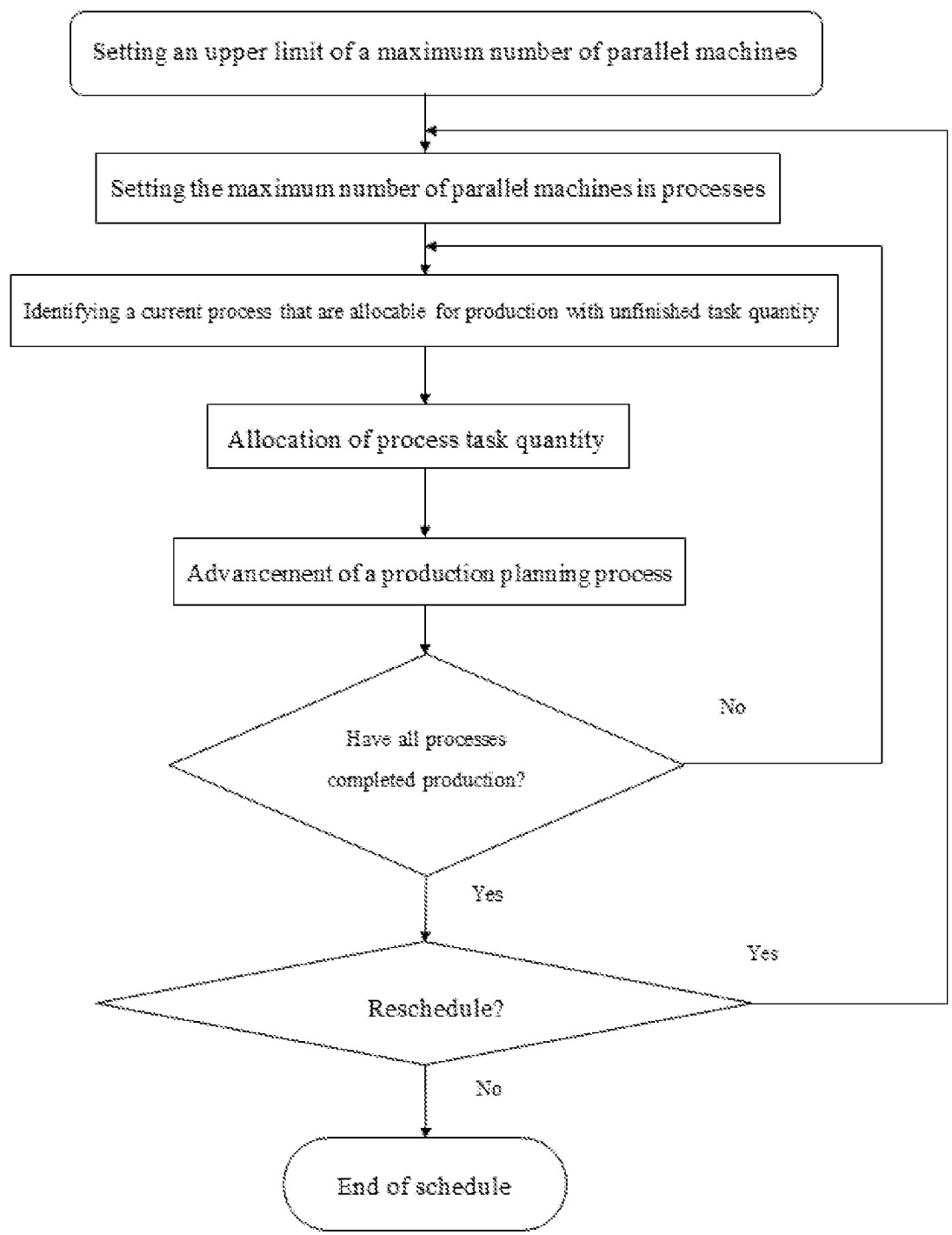

SMART SCHEDULING METHOD SUPPORTING PROCESS TASK VOLUME SPLITTING

CROSS-REFERENCE TO RELATED APPLICATIONS

This application is the U.S. national stage of International Patent Application No. PCT/CN2018/111621, filed on Oct. 24, 2018 and entitled SMART SCHEDULING METHOD SUPPORTING PROCESS TASK VOLUME SPLITTING, which claims the benefit of priority under 35 U.S.C. § 119 from Chinese Patent Application No. 201810409715.0, filed May 2, 2018. The disclosures of the foregoing applications are incorporated herein by reference in their entirety.

TECHNICAL FIELD

The invention relates to the technical field of production planning and scheduling, in particular to an intelligent scheduling method for supporting process task quantity splitting.

TECHNICAL BACKGROUND

With economic globalization, rapid technological changes and rapid changes in the market environment, manufacturing companies are facing increasingly complex production issues. Product life cycles and customer-required delivery periods are shortening. Production methods are also changing from single-variety mass productions to multi-variety and small batch productions. The transformation of production methods has brought challenges to the production planning and scheduling capabilities of companies. Manufacturing companies are faced with the difficulty of accurately predicting delivery dates and lack the ability to quickly respond to customer demands. At the same time, due to the increasingly fierce competition in the industry, various manufacturing companies have begun to shift their focus on expanding profits from increasing sales externally through marketing methods to adopting more advanced production scheduling technologies to reduce production costs and improve resource utilization. The realization of this goal requires the improvement of the information management level of manufacturing companies. Therefore, how to formulate production plans reasonably and efficiently, fully utilize the production potential of the company's production resources, and accurately estimate the delivery date has become a key issue that manufacturing companies need to solve urgently.

Currently, commonly used production planning and scheduling methods are mainly under the MRP/ERP planning system, advanced planning and scheduling, and comprise linear programming, integer programming, genetic algorithm, particle swarm algorithm and other methods. The above production plan scheduling methods are due to the consideration of raw material transportation cost or because of the reason of coarse research granularity, they usually do not design a mechanism for multiple machines of the same type to cooperate to complete process tasks, limiting the task quantity of a single process that may only be allocated to a single machine, so it is impossible to split the task quantity. When the production task quantity is large and the number of idle machines of the same type is large, the machine resources are wasted and the efficiency is low, which leads to the long duration of the task list with a large planned production quantity, or even overdue. In the case of increased resources, it is still impossible to obtain a production plan to complete production before the delivery date.

SUMMARY OF THE INVENTION

The purpose of the present invention is to solve the above-mentioned shortcomings in the prior art and to provide an intelligent scheduling method for supporting process task quantity splitting. Under the constraint of using as few machines as possible, this method identifies machines that may be used in parallel at different periods of production processes for overdue task lists, and coordinates and splits the task quantity of time-consuming processes to achieve production completion within delivery date.

The purpose of the present invention may be achieved by adopting the following technical solutions:

An intelligent scheduling method for supporting process task quantity splitting, comprising the following steps:
 a. setting an upper limit of a maximum number of parallel machines;
 b. setting the maximum number of parallel machines in processes;
 c. identifying a current process that are allocable for production with unfinished task quantity;
 d. an allocation of process task quantity is as follows;
 e. an advancement of a production planning process;
 f. repeating steps c to e until all processes are completed;
 g. determining whether to reschedule, if yes, repeating steps b to e, otherwise, the scheduling ends;
 h. at the end of the scheduling, returning output information of the task list and output information of the machine in a form of a table or output data set.

In the above intelligent scheduling method for supporting process task quantity splitting, the upper limit of the maximum allowable number of parallel machines in the step a is for all processes of all task lists.

In the above intelligent scheduling method for supporting process task quantity splitting, in the step b, during a first scheduling, the maximum allowable number of parallel machines of each process of each task list is set to 1; when rescheduling, for task lists that are overdue, the maximum allowable number of parallel machines is increased by 1 for a process that takes the longest time and with the maximum allowable number of parallel machines not reaching the upper limit.

In the above intelligent scheduling method for supporting process task quantity splitting, in the step c, the set of index numbers of all the machines that perform production tasks for the process at the current moment is recorded, which is called the allocated machine set. Each process has a corresponding allocated machine set, and when the scheduling has not started, allocated machine sets corresponding to all processes are empty.

In the above intelligent scheduling method for supporting process task quantity splitting, the step d comprising the following steps:
 d-1. searching for a machine that matches a machine type required by the current process, is operable, and free at a current moment;
 d-2-1. if there is a machine that meets the conditions, allocating a task quantity; if there is no machine that meets the conditions, instead considering a next process in a process production information table of a task list;
 d-2-2. when an allocated machine set corresponding to the current process is empty, allocating all tasks to the machine, and calculating a production task completion time of machine production information corresponding to the machine based on a planned production quantity of the task list;

d-2-3. when the allocated machine set corresponding to the current process is not empty, accumulating a production quantity of all machines in the allocated machine set at the current time to obtain a total production quantity, subtracting the total production quantity from the planned production quantity of the task list to obtain an unproduced quantity, adding an index number of the new machine to the allocated machine set, evenly distributing the unproduced quantity to each machine in the allocated machine set, and modifying the corresponding production task completion time of the machine production information;

In the above intelligent scheduling method for supporting process task quantity splitting, in the step d-2-2, a calculation of the production task completion time is: the production task completion time=a production task quantity÷a process capacity+a lead time+a post-production time.

In the above intelligent scheduling method for supporting process task quantity splitting, in the step d-2-3, a calculation of a quantity produced by each machine in the allocated machine set at the current moment:

when an operating time of a machine is less than a lead time, its produced quantity=0;

when the operating time of a machine is greater than a lead time and less than the production task completion time minus a post-production time, the quantity produced=floor ((the machine operating time−the lead time)*a process capacity), where floor is round-down function;

when the operating time of a machine is greater than the production task completion time minus the post-production time, the quantity produced=a production task quantity.

In the above intelligent scheduling method for supporting process task quantity splitting, the advancement of the production planning process in the step e comprises moving forward the current time and updating a machine production information table, and a task list production information table; generating the output information of the machine, and the output information of the task list.

In the above intelligent scheduling method for supporting process task quantity splitting, the determining whether to reschedule in the step g specifically comprises two points: (1) whether there is a task list overdue; (2) whether the maximum allowable number of parallel machines for all processes of all overdue task lists reaches the upper limit of the maximum allowable number of parallel machines set in step a. When no task list is overdue or the maximum allowable number of parallel machines for all processes of all overdue task lists reaches the upper limit of the maximum allowable number of parallel machines set in step a, the scheduling ends; otherwise, rescheduling.

In the above intelligent scheduling method for supporting process task quantity splitting, the output information of the task list should comprise the task list number, delivery date, start time, end time and other ancillary information. The output information of the machine should comprise machine number, process number, production quantity, start time, end time and other ancillary information. In the output information of the machine, there are multiple pieces of output information of the machine corresponding to the process in which the task quantity has been split. Each of output information of the machine contains the task quantity data allocated to the machine and actually completed.

The intelligent scheduling method for supporting process task quantity splitting provided by the present invention first sets the upper limit of the maximum allowable number of parallel machines in the scheduling process, then sets the maximum allowable number of parallel machines for each process of each task list. After that, perform the following steps repeatedly in order until all the processes are completed: identifying a current process that are allocable for production with unfinished task quantity; going through processes that have not completed their task quantity to allocate further task quantity for processes where the number of allocated machines has not reached the maximum allowable number of parallel machines; advancement of the production planning process. After all production tasks are completed, determining whether there is a task list overdue and whether the maximum allowable number of parallel machines for a certain process of an overdue task list is less than the set maximum allowable number of parallel machines. If the above two determinations are both negative, then adjusting the maximum allowable number of parallel machines for the process that most needs to split the task quantity, and reschedule production, otherwise the scheduling will end. After the scheduling is over, returning output information of the task list and output information of the machine in a form of a table or output data set.

The existing production planning and scheduling technology usually takes the completion of a single process as the smallest granular production task. The methods designed on this basis naturally ignore the possibility of multi-machine collaboration at different times. In most cases, a single machine completes the entire production task of a certain process, which leads to a bottleneck in the optimization of production efficiency and a waste of resources. Compared with the current commonly used production planning and scheduling methods, which generally only allocate the task quantity of a single process to a single machine, and may not achieve the splitting of the task quantity, and when the production task quantity is large and the number of idle machines of the same type is large, it will cause waste of machine resources and low production efficiency, the present invention may support the asynchronous starting mechanism of the same type of machines with asynchronous operating status. By reasonably splitting the task quantity of a process, the utilization rate of machines is increased, the processing period is shortened, and the principle of using as few machines as possible to control the cost of raw material transportation is adhered to obtain the scheduling result of completing the production within the delivery period.

1) The present invention may make full use of idle machines, allowing multiple machines to cooperate to complete processes with a large task quantity, thereby increasing the utilization rate of the machines, shortening the processing period, and obtaining the scheduling result of completing production within the delivery period.

2) The present invention may consider the restriction that the number of parallel operating machines should be as small as possible due to transportation costs of raw materials, and identify the processes that most need to split the task quantity, so as to shorten the processing period with as less task quantity splitting as possible.

3) The present invention does not have the limitation that the task quantity needs to be equally distributed to multiple machines at the same time. It may handle the situation of tight machine use, and use idle machines in time, and has the characteristics of flexible coordination of machine operating time.

DESCRIPTION OF THE FIGURE

FIG. 1 is a flow chart of the intelligent scheduling method for supporting process task quantity splitting as disclosed by the present invention.

DETAILED DESCRIPTION

In order to make the objectives, technical solutions and advantages of the embodiments of the present invention clearer, the following will be combined with the FIGURE of the embodiments of the present invention to describe the technical solutions of the embodiments of the present invention clearly and completely. Obviously, the described embodiments are part of the embodiments of the present invention, rather than all of the embodiments. Based on the embodiments of the present invention, all other embodiments obtained by those of ordinary skill in the art without inventive work shall fall within the protection scope of the present invention.

EMBODIMENTS

In view of the current commonly used production planning and scheduling methods, generally only the task quantity of a single process is allocated to a single machine, it is impossible to split the task quantity. When the production task quantity is large and the number of idle machines of the same type is large, the machine resources are wasted and the efficiency is low, which leads to the long duration of the task list with a large planned production quantity, or even overdue. In the case of increased resources, it is still impossible to obtain a production plan to complete production before the delivery date.

As shown in FIG. 1, this embodiment discloses an intelligent scheduling method for supporting process task quantity splitting. The main process includes the following steps:
  a. setting an upper limit of a maximum number of parallel machines;
  b. setting the maximum number of parallel machines in processes;
  c. identifying a current process that are allocable for production with unfinished task quantity;
  d. an allocation of process task quantity is as follows;
  e. an advancement of a production planning process;
  f. repeating steps c to e until all processes are completed;
  g. determining whether to reschedule, if yes, repeating steps b to e, otherwise, the scheduling ends;
  h. at the end of the scheduling, returning output information of the task list and output information of the machine in a form of a table or output data set.

The upper limit of the maximum allowable number of parallel machines in the step a is for all processes of all task lists.

In the step b, during a first scheduling, the maximum allowable number of parallel machines of each process of each task list is set to 1; when rescheduling, for task lists that are overdue, the maximum allowable number of parallel machines is increased by 1 for a process that takes the longest time and with the maximum allowable number of parallel machines not reaching the upper limit.

In the step c, identified processes are divided into two categories: one is for processes that have allocated machines with unfinished planned task quantity, the other is for processes that do not have allocated machines but with conditions to start production. The set of index numbers of all the machines that perform production tasks for the process at the current moment is recorded, which is called the allocated machine set. Each process has a corresponding allocated machine set, and when the scheduling has not started, allocated machine sets corresponding to all processes are empty.

The step d comprising the following steps:
  d-1. searching for a machine that matches a machine type required by the current process, is operable, and free at a current moment;
  d-2-1. if there is a machine that meets the conditions, allocating a task quantity; if there is no machine that meets the conditions, instead considering a next process in a process production information table of a task list;
  d-2-2. when an allocated machine set corresponding to the current process is empty, allocating all tasks to the machine, and calculating a production task completion time of machine production information corresponding to the machine based on a planned production quantity of the task list;
  d-2-3. when the allocated machine set corresponding to the current process is not empty, accumulating a production quantity of all machines in the allocated machine set at the current time to obtain a total production quantity, subtracting the total production quantity from the planned production quantity of the task list to obtain an unproduced quantity, adding an index number of the new machine to the allocated machine set, evenly distributing the unproduced quantity to each machine in the allocated machine set, and modifying the corresponding production task completion time of the machine production information;

In the above step d-2-2, a calculation of the production task completion time is: the production task completion time=a production task quantity÷a process capacity+a lead time+a post-production time.

In the above step d-2-3, a calculation of a quantity produced by each machine in the allocated machine set at the current moment:
  when an operating time of a machine is less than a lead time, its produced quantity=0;
  when the operating time of a machine is greater than a lead time and less than the production task completion time minus a post-production time, the quantity produced=floor ((the machine operating time−the lead time)*a process capacity), where floor is round-down function;
  when the operating time of a machine is greater than the production task completion time minus the post-production time, the quantity produced=a production task quantity.

The advancement of the production planning process in the above step e comprises moving forward the current time and updating a machine production information table, and a task list production information table; generating the output information of the machine, and the output information of the task list.

The determining whether to reschedule in the above step g specifically comprises two points: (1) whether there is a task list overdue; (2) whether the maximum allowable number of parallel machines for all processes of all overdue task lists reaches the upper limit of the maximum allowable number of parallel machines set in step a. When no task list is overdue or the maximum allowable number of parallel machines for all processes of all overdue task lists reaches the upper limit of the maximum allowable number of parallel machines set in step a, the scheduling ends; otherwise, rescheduling.

In the above step h, the output information of the task list should comprise the task list number, delivery date, start time, end time and other ancillary information. The output information of the machine should comprise machine number, process number, production quantity, start time, end time and other ancillary information. In the output information of the machine, there are multiple pieces of output information of the machine corresponding to the process in which the task quantity has been split. Each of output information of the machine contains the task quantity data allocated to the machine and actually completed.

The above embodiments are preferred embodiments of the present invention, but the embodiments of the present invention are not limited by the above embodiments, and any other changes, modifications, substitutions, combinations, simplifications made without departing from the spirit and principle of the present invention, all should be equivalent replacement methods, and are all included in the protection scope of the present invention.

The invention claimed is:

1. An intelligent scheduling method for supporting process task quantity splitting, characterized in that the intelligent scheduling method comprises the following steps:
   a. setting an upper limit of a maximum number of parallel machines;
   b. setting the maximum number of parallel machines in processes;
   c. identifying current processes with unfinished task quantities that are allocable for production, wherein the identified processes are divided into a first category and a second category, wherein the first category is for processes that have allocated machines and the second category is for processes that do not have allocated machines but which meet conditions to start production;
   d. allocating processing of a task quantity as follows:
   d-1. searching for a machine that matches a machine type required by the current process, is operable, and is free at a current moment;
   d-2-1. if there is a machine that meets the conditions of step d-1, allocating a task quantity; or if there is no machine that meets the conditions of step d-1, then considering a next process in a process production information table of a task list;
   d-2-2. when an allocated machine set corresponding to the current process is empty, allocating all tasks to the machine and calculating a production task completion time of machine production information corresponding to the machine based on a planned production quantity of the task list, wherein the allocated machine set is a set that records index numbers of all machines that perform production tasks for the current process at the current moment;
   d-2-3. when the allocated machine set corresponding to the current process is not empty, accumulating a production quantity of all machines in the allocated machine set at the current time to obtain a total production quantity, subtracting the total production quantity from the planned production quantity of the task list to obtain an unproduced quantity, adding an index number of the new machine to the allocated machine set, evenly distributing the unproduced quantity to each machine in the allocated machine set, and modifying the corresponding production task completion time of the machine production information;
   e. advancing a production planning process;
   f. repeating steps c to e until all processes are completed;
   g. determining (1) whether there is a task list overdue and (2) whether the maximum allowable number of parallel machines for all processes of all overdue task lists reaches the upper limit of the maximum allowable number of parallel machines set in step a,
   wherein when no task list is overdue or the maximum allowable number of parallel machines for all processes of all overdue task lists reaches the upper limit of the maximum allowable number of parallel machines set in step a, the scheduling ends, otherwise, rescheduling is performed by repeating steps b to e; and
   h. at the end of the scheduling, returning output information of the task list and output information of the machine in a table or output data set.

2. The intelligent scheduling method for supporting process task quantity splitting according to claim 1, characterized in that, the upper limit of the maximum allowable number of parallel machines in step a. is for all processes of all task lists.

3. The intelligent scheduling method for supporting process task quantity splitting according to claim 1, characterized in that, in step b., during a first scheduling, the maximum allowable number of parallel machines of each process of each task list is set to 1; and when rescheduling, for task lists that are overdue, the maximum allowable number of parallel machines is increased by 1 for a process that takes the longest time and with the maximum allowable number of parallel machines not reaching the upper limit.

4. The intelligent scheduling method for supporting process task quantity splitting according to claim 1, characterized in that, each process has a corresponding allocated machine set, and when the scheduling has not started, allocated machine sets corresponding to all processes are empty.

5. The intelligent scheduling method for supporting process task quantity splitting according to claim 1, characterized in that, in step d-2-2, a calculation of the production task completion time is as follows:
the production task completion time=a production task quantity÷a process capacity+a lead time+a post-production time.

6. The intelligent scheduling method for supporting process task quantity splitting according to claim 1, characterized in that, in step d-2-3, a calculation of a quantity produced by each machine in the allocated machine set at the current moment is as follows:
   when an operating time of a machine is less than a lead time, its produced quantity=0;
   when the operating time of a machine is greater than a lead time and less than the production task completion time minus a post-production time, the quantity produced=floor ((the machine operating time−the lead time)*a process capacity), where floor is round-down function; and
   when the operating time of a machine is greater than the production task completion time minus the post-production time, the quantity produced=a production task quantity.

7. The intelligent scheduling method for supporting process task quantity splitting according to claim 1, characterized in that, the advancement of the production planning process in step e. comprises moving forward the current time and updating a machine production information table, and a task list production information table; generating the output information of the machine, and the output information of the task list.

* * * * *